(12) United States Patent
Kim

(10) Patent No.: US 11,396,816 B2
(45) Date of Patent: Jul. 26, 2022

(54) AIRFOIL FOR TURBINES, AND TURBINE AND GAS TURBINE INCLUDING THE SAME

(71) Applicant: DOOSAN HEAVY INDUSTRIES & CONSTRUCTION CO., LTD., Changwon-si (KR)

(72) Inventor: Ye Jee Kim, Seoul (KR)

(*) Notice: Subject to any disclaimer, the term of this patent is extended or adjusted under 35 U.S.C. 154(b) by 250 days.

(21) Appl. No.: 16/736,047

(22) Filed: Jan. 7, 2020

(65) Prior Publication Data

US 2020/0270999 A1    Aug. 27, 2020

(30) Foreign Application Priority Data

Feb. 21, 2019    (KR) .................. 10-2019-0020311

(51) Int. Cl.
*F01D 5/18* (2006.01)
*F02C 7/12* (2006.01)
*F02C 3/04* (2006.01)
*F01D 5/02* (2006.01)

(52) U.S. Cl.
CPC ............. *F01D 5/18* (2013.01); *F01D 5/02* (2013.01); *F02C 3/04* (2013.01); *F02C 7/12* (2013.01); *F05D 2220/32* (2013.01); *F05D 2240/24* (2013.01); *F05D 2240/35* (2013.01); *F05D 2260/221* (2013.01)

(58) Field of Classification Search
CPC ... F01D 5/18; F01D 5/02; F01D 5/187; F02C 3/04; F02C 7/12; F05D 2220/32; F05D 2240/24; F05D 2240/35; F05D 2260/221
See application file for complete search history.

(56) References Cited

U.S. PATENT DOCUMENTS

| 7,014,424 | B2 | 3/2006 | Cunha et al. | |
|---|---|---|---|---|
| 7,435,053 | B2 | 10/2008 | Liang | |
| 10,655,476 | B2* | 5/2020 | Halfmann | F01D 5/187 |
| 10,683,763 | B2* | 6/2020 | Halfmann | F01D 5/188 |
| 2005/0276698 | A1* | 12/2005 | Kvasnak | F01D 5/188 |
| | | | | 416/115 |
| 2006/0140762 | A1* | 6/2006 | Pietraszkiewicz | F01D 5/186 |
| | | | | 416/97 R |
| 2010/0239412 | A1* | 9/2010 | Draper | F01D 5/186 |
| | | | | 415/115 |

(Continued)

FOREIGN PATENT DOCUMENTS

| JP | 2006-002757 A | 1/2006 |
|---|---|---|
| JP | 2010-216471 A | 9/2010 |

(Continued)

*Primary Examiner* — Justin D Seabe
*Assistant Examiner* — Andrew Thanh Bui
(74) *Attorney, Agent, or Firm* — Harvest IP Law, LLP

(57) ABSTRACT

An airfoil, a turbine, and a gas turbine having enhanced cooling performance are provided. The airfoil including a leading edge and a trailing edge may include: a first cooling passage connected to the leading edge; a second cooling passage connected to the trailing edge; a third cooling passage formed between the first cooling passage and the second cooling passage; a plurality of partitions provided in the second cooling passage and configured to partition the second cooling passage into a plurality of portions in a height direction of the second cooling passage; and a perforated plate extending in the height direction of the second cooling passage, and coupled with the partitions to support the partitions.

16 Claims, 7 Drawing Sheets

(56) References Cited

U.S. PATENT DOCUMENTS

| | | | | |
|---|---|---|---|---|
| 2012/0230838 A1* | 9/2012 | Hada | ...................... | F01D 5/187 |
| | | | | 416/97 R |
| 2013/0343872 A1* | 12/2013 | Tibbott | ................... | F01D 9/06 |
| | | | | 415/115 |
| 2014/0083116 A1* | 3/2014 | Crites | ................... | F01D 5/187 |
| | | | | 60/806 |

FOREIGN PATENT DOCUMENTS

| KR | 10-2006-0073428 A | 6/2006 |
|---|---|---|
| KR | 10-2013-0045903 A | 5/2013 |
| KR | 1020150082944 A | 7/2015 |

\* cited by examiner

AIRFOIL FOR TURBINES, AND TURBINE AND GAS TURBINE INCLUDING THE SAME

CROSS-REFERENCE TO RELATED APPLICATION

This application claims priority to Korean Patent Application No. 10-2019-0020311, filed on Feb. 21, 2019, the disclosure of which is incorporated herein by reference in its entirety.

BACKGROUND

Field

Apparatuses and methods consistent with exemplary embodiments relate to an airfoil for turbines, and a turbine and a gas turbine including the airfoil.

Description of the Related Art

A gas turbine is a power engine configured to mix fuel with air compressed by a compressor, combust the mixture of the fuel and the compressed air, and rotate a turbine using high-temperature gas generated by the combustion. Gas turbines are used to drive a generator, an aircraft, a vessel, a train, and so forth.

The gas turbine includes a compressor, a combustor, and a turbine. The compressor draws external air thereinto, compresses the air, and transmits it to the combustor. The combustor mixes fuel with compressed air supplied from the compressor, and combusts the mixture of the fuel and the compressed air to generate a high temperature and high-pressure combustion gas. Combustion gas generated by the combustion is discharged to the turbine. Turbine blades provided in the turbine are rotated by the combustion gas, and power is generated. Generated power may be used in various fields, e.g., for generating electricity, driving a mechanical device, etc.

Recently, to increase the efficiency of a turbine, the temperature (i.e., turbine inlet temperature: TIT) of gas that is drawn into the turbine is on a gradual upward trend. Hence, the importance of heat-resistant treatment and cooling of turbine blades is being emphasized.

A method of cooling a turbine blade includes a film cooling scheme and an internal cooling scheme. The film cooling scheme is a scheme in which a coating film is formed on an outer surface of the turbine blade so that heat may be prevented from being transferred from the outside to the blade. In the film cooling scheme, heat-resistant characteristics and mechanical durability of the turbine blade depend on heat-resistant paint to be applied to the turbine blade.

The internal cooling scheme is a scheme of cooling the blade by heat exchange between cooling fluid and the blade. Generally, the turbine blade is cooled by compressed cooling air supplied from the compressor of the gas turbine. Because air compressed by the compressor is generated to be used in the combustor of the gas turbine, the entire efficiency of the gas turbine may be reduced if the amount of compressed air is increased to cool the turbine blade. Therefore, to efficiently cooling the turbine blade, the entirety of the turbine blade is required to be uniformly cooled by a small amount of cooling fluid.

SUMMARY

Aspects of one or more exemplary embodiments provide an airfoil, a turbine, and a gas turbine having enhanced cooling performance.

Additional aspects will be set forth in part in the description which follows and, in part, will become apparent from the description, or may be learned by practice of the exemplary embodiments.

According to an aspect of an exemplary embodiment, there is provided an airfoil including a leading edge and a trailing edge including: a first cooling passage connected to the leading edge; a second cooling passage connected to the trailing edge; a third cooling passage formed between the first cooling passage and the second cooling passage; a plurality of partitions provided in the second cooling passage and configured to partition the second cooling passage into a plurality of portions in a height direction of the second cooling passage; and a perforated plate extending in the height direction of the second cooling passage, and coupled with the partitions to support the partitions.

The airfoil may further include a first dividing plate formed in the third cooling passage and configured to face the perforated plate, and including an upper end spaced apart from a top surface of a turbine blade. A gap between the first dividing plate and the perforated plate may be gradually reduced from an outer side to an inner side.

The airfoil may further include a second dividing plate formed in the third cooling passage and configured to face the first dividing plate, and including an upper end spaced apart from the top surface of the turbine blade. A gap between the second dividing plate and the first dividing plate may be gradually increased from the outer side to the inner side.

The airfoil may further include a plurality of rear end cooling slots formed in the second cooling passage to discharge air from the second cooling passage and spaced apart from each other in a height direction of the trailing edge.

The number of holes formed in the perforated plate per unit area may be gradually increased from the outer side to the inner side.

A gap between the perforated plate and the trailing edge may be gradually increased from an outer side to an inner side.

The partition that is disposed at the inner side may have a width greater than a width of the partition that is disposed at the outer side.

The airfoil may further include a first dividing plate formed in the third cooling passage and configured to face the perforated plate, and including an upper end coming into contact with a top surface of a turbine blade.

The first dividing plate may form a first intermediate passage through which air drawn from a lower portion of the airfoil rises, and a gap between the first dividing plate and the perforated plate may be gradually increased from an outer side to an inner side.

A hole formed in the perforated plate may include a first passage perpendicularly connected to a surface of the perforated plate, a second passage spaced apart from the first passage, and a third passage connecting the first passage and the second passage and inclined with respect to the first passage and the second passage.

According an aspect of another exemplary embodiment, there is provided a turbine including: a rotor disk configured to be rotatable; and a plurality of turbine blades installed on the rotor disk. Each of the turbine blades may include an airfoil having a blade shape and including a leading edge and a trailing edge, a platform coupled to a lower portion of the airfoil, and a root member protruding downward from the platform and coupled to the rotor disk. The airfoil may include: a first cooling passage connected to the leading edge; a second cooling passage connected to the trailing edge; a third cooling passage formed between the first cooling passage and the second cooling passage; a plurality of partitions provided in the second cooling passage and configured to partition the second cooling passage into a plurality of portions in a height direction of the second cooling passage; and a perforated plate extending in the height direction of the second cooling passage e, and coupled with the partitions.

The airfoil may further include a first dividing plate formed in the third cooling passage and configured to face the perforated plate, and including an upper end spaced apart from a top surface of the turbine blade. A gap between the first dividing plate and the perforated plate may be gradually reduced from an outer side to an inner side.

The airfoil may further include a second dividing plate formed in the third cooling passage and configured to face the first dividing plate, and including an upper end spaced apart from the top surface of the turbine blade. A gap between the second dividing plate and the first dividing plate may be gradually increased from the outer side to the inner side.

The airfoil may further include a plurality of rear end cooling slots formed in the second cooling passage to discharge air from the second cooling passage and spaced apart from each other in a height direction of the trailing edge.

The number of holes formed in the perforated plate per unit area may be gradually increased from the outer side to the inner side.

A gap between the perforated plate and the trailing edge may be gradually increased from an outer side to an inner side.

The partition that is disposed at the inner side may have a width greater than a width of the partition that is disposed at the outer side.

The airfoil may further include a first dividing plate formed in the third cooling passage and configured to face the perforated plate, and including an upper end coming into contact with a top surface of the turbine blade.

The first dividing plate may form a first intermediate passage through which air drawn from a lower portion of the airfoil rises, and a gap between the first dividing plate and the perforated plate may be gradually increased from an outer side to an inner side.

According an aspect of another exemplary embodiment, there is provided a gas turbine including: a compressor configured to compress air drawn thereinto from an outside; a combustor configured to mix fuel with air compressed by the compressor and combust a mixture of the fuel and the compressed air; and a turbine including a plurality of turbine blades configured to be rotated by combustion gas discharged from the combustor. Each of the turbine blades may include an airfoil having a blade shape and including a leading edge and a trailing edge, a platform coupled to a lower portion of the airfoil, and a root member protruding downward from the platform and coupled to the rotor disk. The airfoil may include: a first cooling passage connected to the leading edge; a second cooling passage connected to the trailing edge; a third cooling passage formed between the first cooling passage and the second cooling passage; a plurality of partitions provided in the second cooling passage and configured to partition the second cooling passage into a plurality of portions in a height direction of the second cooling passage; and a perforated plate extending in the height direction of the second cooling passage, and coupled with the partitions.

BRIEF DESCRIPTION OF THE DRAWINGS

The above and other aspects will be more clearly understood from the following description of the exemplary embodiments with reference to the accompanying drawings, in which.

DETAILED DESCRIPTION

Figure 1:
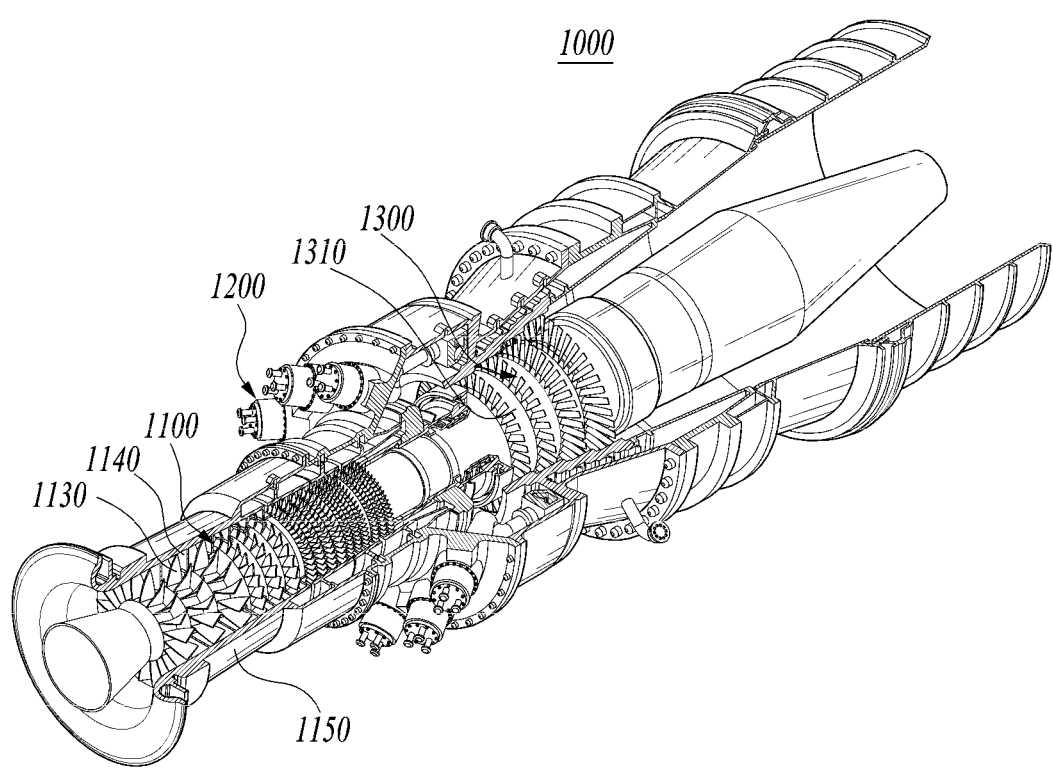
FIG. 1 is a diagram illustrating an internal structure of a gas turbine in accordance with an exemplary embodiment.

Various modifications and various embodiments will be described in detail with reference to the drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

The terminology used herein is for the purpose of describing specific embodiments only and is not intended to limit the scope of the disclosure. The singular expressions "a", "an", and "the" are intended to include the plural expressions as well, unless the context clearly indicates otherwise. In the disclosure, the terms such as "comprise", "include", "have/has" should be construed as designating that there are such features, integers, steps, operations, elements, components, and/or combinations thereof, not to exclude the presence or possibility of adding of one or more of other features, integers, steps, operations, elements, components, and/or combinations thereof.

Hereinafter, exemplary embodiments will be described in detail with reference to the accompanying drawings. Reference now should be made to the drawings, in which the same reference numerals are used throughout the different drawings to designate the same or similar components. Details of well-known configurations and functions may be omitted to avoid unnecessarily obscuring the gist of the present disclosure. For the same reason, in the accompanying drawings, some elements are enlarged, omitted, or depicted schematically.

Figure 2:
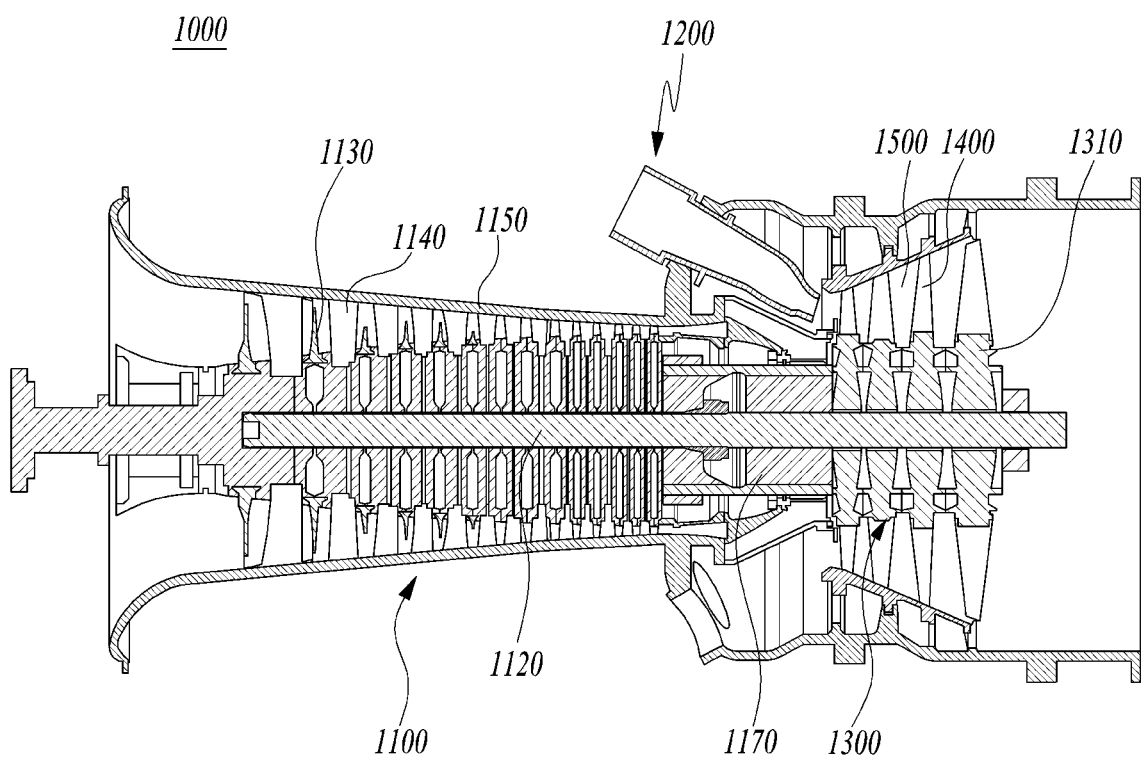
FIG. 2 is a longitudinal sectional view illustrating a portion of the gas turbine of FIG. 1.

FIG. 1 is a diagram illustrating an internal structure of a gas turbine in accordance with an exemplary embodiment, and FIG. 2 is a longitudinal sectional view of a portion of the gas turbine of FIG. 1.

For example, the thermodynamic cycle of the gas turbine 1000 in accordance with the exemplary embodiment may ideally comply with the Brayton cycle. The Brayton cycle may consist of four processes including an isentropic compression (i.e., adiabatic compression) process, an isobaric heat supply process, an isentropic expansion (i.e., adiabatic expansion) process, and an isobaric heat rejection process.

In other words, the gas turbine may draw air from the atmosphere, compress the air to a high pressure, combust fuel under isobaric conditions to emit thermal energy, expand the high-temperature combustion gas to convert the thermal energy of the combustion gas into kinetic energy, and discharge exhaust gas with residual energy to the atmosphere. As such, the Brayton cycle may consist of four processes including compression, heat addition, expansion, and heat rejection.

Referring to FIGS. 1 and 2, the gas turbine 1000 embodying the Brayton cycle may include a compressor 1100, a combustor 1200, and a turbine 1300.

The compressor 1100 may draw air from the outside and compress the air. The compressor 1100 may supply air compressed by compressor blades 1130 to the combustor 1200 and also supply compressed air for cooling to a high-temperature region needed to be cooled in the gas turbine 1000. Here, drawn air is compressed in the compressor 1100 through an adiabatic compression process, so that the pressure and the temperature of air passing through the compressor 1100 are increased.

The compressor 1100 is designed in the form of a centrifugal compressor or an axial compressor. The centrifugal compressor is used in a small gas turbine. On the one hand, in a large gas turbine such as the gas turbine 1000 illustrated in FIG. 1, a multi-stage axial compressor 1100 is used to compress a large amount of air. In the multi-stage axial compressor 1100, the compressor blades 1130 rotate along with rotation of a center tie rod 1120 and a rotor disk, compress drawn air, and transfer compressed air to compressor vanes 1140 disposed at a following stage. Air is compressed gradually to high pressures while passing through the compressor blades 1130 formed in a multi-stage structure.

The compressor vanes 1140 may be mounted to an inner surface of a housing 1150 in such a way that a plurality of compressor vanes 1140 form each stage. The compressor vanes 1140 guide compressed air transferred from the compressor blades 1130 disposed at a preceding stage, toward the compressor blades 1130 disposed at the following stage. In an exemplary embodiment, at least some of the plurality of compressor vanes 1140 may be mounted so as to be rotatable within a predetermined range, e.g., to adjust the flow rate of air.

The compressor 1100 may be operated using some of the power output from the turbine 1300. To this end, a rotating shaft of the compressor 1100 may be directly coupled with a rotating shaft of the turbine 1300 by a torque tube 1170. In the case of the large gas turbine 1000, almost half of the output produced by the turbine 1300 may be consumed to drive the compressor 1100.

The combustor 1200 may mix fuel with compressed air supplied from the compressor 1100 and combust the mixture through an isobaric combustion process to generate combustion gas having high energy. The combustor 1200 mixes introduced compressed air with fuel, combusts the fuel mixture to generate high-temperature and high-pressure combustion gas having high energy, and increases, through an isobaric combustion process, the temperature of the combustion gas to a heat resistant limit temperature at which the combustor and the turbine can endure.

A plurality of combustors constituting the combustor 1200 may be arranged in a housing in a form of a cell. Each of the combustors includes a burner including a fuel injection nozzle, etc., a combustor liner forming a combustion chamber, and a transition piece serving as a connector between the combustor and the turbine.

The high-temperature and high-pressure combustion gas ejected from the combustor 1200 is supplied to the turbine 1300. The supplied high-temperature and high-pressure combustion gas expands and applies impingement or reaction force to the turbine blades 1400 to generate rotational torque. A portion of the rotational torque is transmitted to the compressor 1100 via the torque tube 1170, and the remaining portion which is the excessive torque is used to drive the generator or the like.

The turbine 1300 includes a rotor disk 1310, a plurality of turbine blades 1400 which are radially disposed on the rotor disk 1310, and vanes 1500.

The rotor disk 1310 has an approximately disk shape, and a plurality of slots are formed in an outer circumferential surface of the rotor disk 1310. Each slot has a corrugated surface. The turbine blades 1400 are inserted into the respective slots. Each turbine blades 1400 may be coupled to the rotor disk 1310 in a dovetail coupling manner. The vanes 1500 fixed to the housing are provided between the turbine blades 1400 to guide a flow direction of combustion gas passing through the turbine blades 1400.

Figure 3:
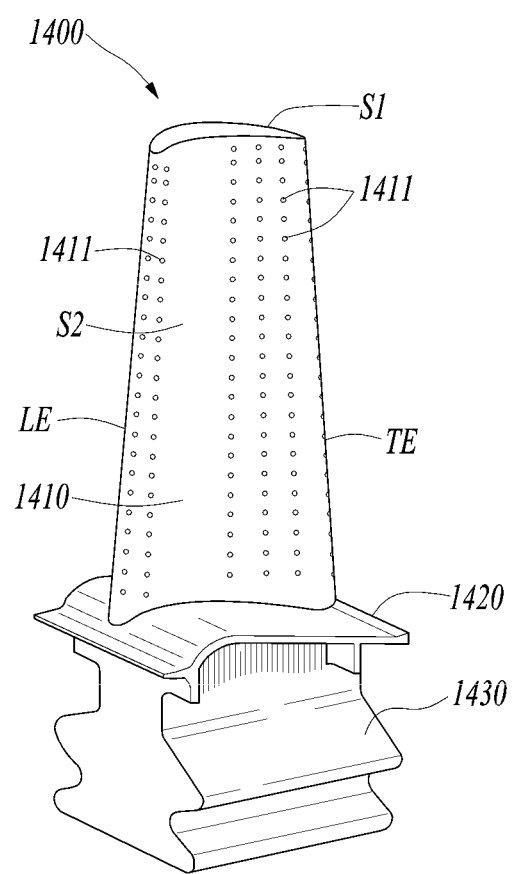
FIG. 3 is a perspective view illustrating a turbine blade in accordance with an exemplary embodiment.
Figure 4:
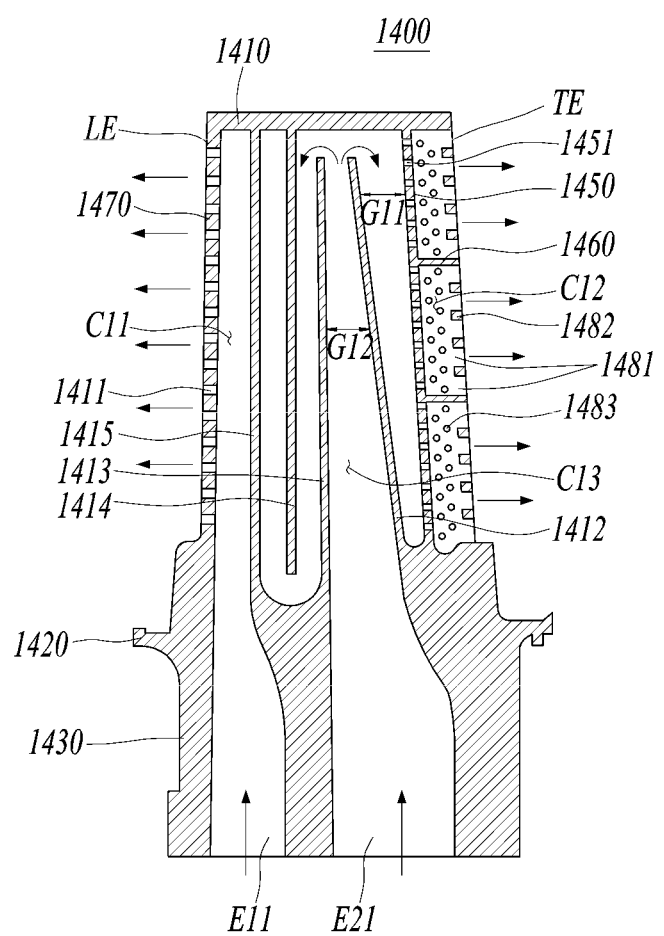
FIG. 4 is a longitudinal sectional view illustrating the turbine blade in accordance with an exemplary embodiment.

FIG. 3 is a perspective view illustrating a turbine blade in accordance with an exemplary embodiment, and FIG. 4 is a longitudinal sectional view illustrating the turbine blade in accordance with the exemplary embodiment.

Referring to FIGS. 3 and 4, the turbine blade 1400 includes an airfoil 1410 having a blade shape, a platform 1420 coupled to a lower portion of the airfoil 1410, and a root member 1430 which protrudes downwards from the platform 1420 and is coupled to the rotor disk. The airfoil 1410 may be a curved plate having a blade shape, and have an optimized blade shape according to specifications of the gas turbine 1000.

The platform 1420 may be disposed between the airfoil 1410 and the root member 1430 and have an approximately rectangular plate or rectangular pillar shape. The platform 1420 has a side surface which comes into contact with a side surface of the platform 1420 of an adjacent turbine blade 1400 to maintain an interval between the adjacent turbine blades 1400.

The root member 1430 has a corrugated portion having an approximately fir-tree shape corresponding to the fir-tree-shaped corrugated portion formed in a slot of the rotor disk 1310. It is understood that the coupling structure of the root member 1430 is not limited thereto, and may be formed to have a dovetail structure. A first inlet E11 and a second inlet E12 for supply of cooling air may be formed in a lower end of the root member 1430.

The airfoil 1410 may include a leading edge LE disposed at an upstream side based on a flow direction of combustion gas, and a trailing edge TE disposed at a downstream side. Furthermore, a suction side S1 protruding outward to have an outward-convex curved surface is formed on a front surface of the airfoil 1410 onto which combustion gas is drawn, and a pressure side S2 having a curved surface depressed in a concaved shape toward the suction side S1 is formed on a rear surface of the airfoil 1410. A difference in pressure occurs between the suction side S1 and the pressure side S2 of the airfoil 1410, whereby the turbine 1300 is rotated.

A plurality of cooling holes 1411 are formed in a surface of the airfoil 1410. The cooling holes 1411 communicate with a cooling passage formed in the airfoil 1410 so that cooling air may be supplied to the surface of the airfoil 1410.

The airfoil 1410 may include an outer wall 1470 which forms an outer appearance, and cooling passages C11, C12, and C13, dividing plates 1412, 1413, 1414, and 1415, partitions 1460, and a perforated plate 1450 which are formed inside the outer wall 1470. The airfoil 1410 may include a first cooling passage C11 connected with the leading edge LE, a second cooling passage C12 connected with the trailing edge TE, and a third cooling passage C13 formed between the first cooling passage C11 and the second cooling passage C12. The airfoil 1410 may include a first dividing plate 1412, a second dividing plate 1413, a third dividing plate 1414, and a fourth dividing plate 1415 which extend in a height direction of the airfoil 1410 and divide an internal space of the airfoil 1410 into several portions.

The first cooling passage C11 is formed by the leading edge LE and the fourth dividing plate 1415 and communicates with a first inlet E11 formed in a lower portion of the turbine blade 1400. Some of air drawn into the first cooling passage C11 is discharged through the cooling holes 1411 formed adjacent to the leading edge LE, and the other air is supplied to the second cooling passage C12.

The second cooling passage C12 may be formed by the perforated plate 1450 and the partitions 1460. A plurality of cooling fins 1483 may be formed in the second cooling passage C12. The partitions 1460 are spaced apart from each other in a height direction of the second cooling passage C12 and function to partition the second cooling passage C12 into several portions. Although three partitions 1460 are installed in the second cooling passage C12, it is not limited thereto.

The perforated plate 1450 extends in the height direction of the second cooling passage C12 and defines the second cooling passage C12. A plurality of holes 1451 are formed in the perforated plate 1450. One end of each partitions 1460 may be coupled to the perforated plate 1450, and the other end thereof may be coupled to the trailing edge TE. The number of holes 1451 formed in the perforated plate 1450 per unit area may be gradually increased from the outer side to the inner side. As such, if the partitions 1460 are formed in the second cooling passage C12 and are coupled with the perforated plate 1450, air may be uniformly supplied to the second cooling passage C12 partitioned by the partitions 1460.

The airfoil 1410 may further include a plurality of rear end cooling slots 1481 connected with the second cooling passage C12 to discharge air from the second cooling passage C12 and spaced apart from each other in a height direction of the trailing edge TE, and a dividing protrusion 1482 formed between the rear end cooling slots 1481 to separate the rear end cooling slots 1481 from each other. Air drawn into the second cooling passage C12 through the perforated plate 1450 is discharged through the rear end cooling slots 1481.

The third cooling passage C13 is formed in a zigzag pattern by the first dividing plate 1412, the second dividing plate 1413, the third dividing plate 1414, and the fourth dividing plate 1415. The first dividing plate 1412 is disposed between the perforated plate 1450 and the second dividing plate 1413. The first dividing plate 1412 and the second dividing plate 1413 are spaced apart from an upper end tip of the airfoil 1410. The third dividing plate 1414 is disposed between the second dividing plate 1413 and the fourth dividing plate 1415. A lower end of the third dividing plate 1414 is spaced apart from a lower support structure so that air may move over the lower end of the third dividing plate 1414.

Air supplied through a second inlet E12 moves along space defined between the first dividing plate 1412 and the second dividing plate 1413, and some of the air moves into space defined between the first dividing plate 1412 and the perforated plate 1450 and then is supplied to the second cooling passage C12. The other air moves into space defined between the second dividing plate 1413 and the third dividing plate 1414 and between the third dividing plate 1414 and the fourth dividing plate 1415 and then is discharged through the cooling holes 1411.

Here, a gap G11 between the first dividing plate 1412 and the perforated plate 1450 is gradually reduced from the outer side to the inner side. Hence, air that moves between the first dividing plate 1412 and the perforated plate 1450 may be guided in a lateral direction to uniformly pass through the perforated plate 1450 and then moved into the second cooling passage C12. Furthermore, a gap G12 between the first dividing plate 1412 and the second dividing plate 1413 is gradually increased from the outer side to the inner side. Hence, the speed of air that moves between the first dividing plate 1412 and the second dividing plate 1413 may gradually increase so that air may be supplied to the second cooling passage C12.

Figure 5:
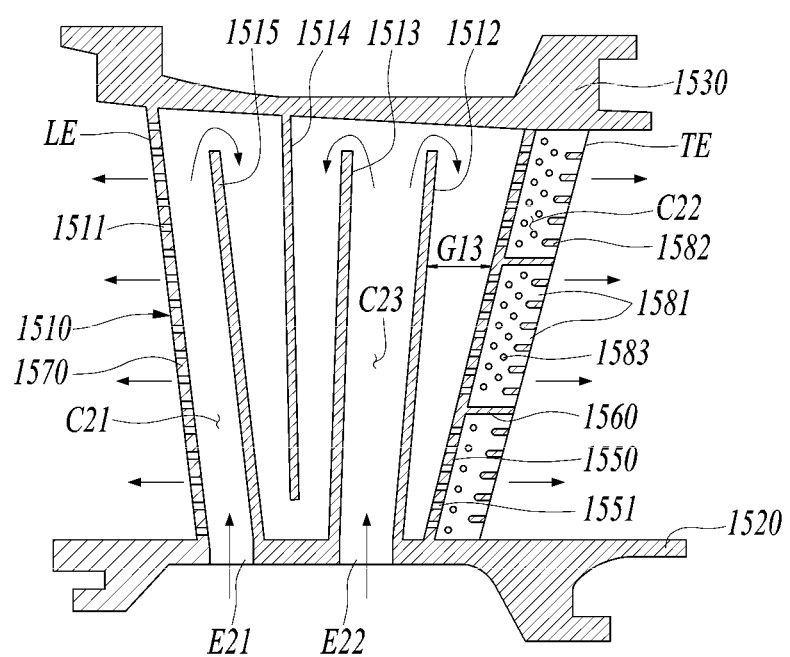
FIG. 5 is a longitudinal sectional view illustrating a vane in accordance with an exemplary embodiment.

FIG. 5 is a longitudinal sectional view illustrating a vane in accordance with the exemplary embodiment.

Referring to FIG. 5, the vane 1500 may include an inner shroud 1520, an outer shroud 1530, and an airfoil 1510 disposed between the inner shroud 1520 and the outer shroud 1530. FIG. 5 illustrates a case in which a first inlet E21 and a second inlet E22 through which air is drawn into the vane 1500 are formed in the inner shroud 1520, but it understood that this is only an example and other exemplary embodiments are not limited thereto. For example, the first inlet E21 and the second inlet E22 may be formed in the outer shroud 1530.

The airfoil 1510 may include a leading edge LE disposed at an upstream side based on a flow direction of combustion gas, and a trailing edge TE disposed at a downstream side. A plurality of cooling holes 1511 formed in a surface of the airfoil 1510 communicate with a cooling passage formed in the airfoil 1510 so that cooling air may be supplied to the surface of the airfoil 1510.

The airfoil 1510 may include an outer wall 1570 which forms an outer appearance, and cooling passages C21, C22, and C23, dividing plates 1512, 1513, 1514, and 1515, partitions 1560, and a perforated plate 1550 which are formed inside the outer wall 1570. The airfoil 1510 may include a first cooling passage C21 connected with the leading edge LE, a second cooling passage C22 connected with the trailing edge TE, and a third cooling passage C23 formed between the first cooling passage C21 and the second cooling passage C22. The airfoil 1510 may include a first dividing plate 1512, a second dividing plate 1513, a third dividing plate 1514, and a fourth dividing plate 1515 which extend in a height direction of the airfoil 1510 and divide an internal space of the airfoil 1510 into several portions.

The first cooling passage C21 is formed by the leading edge LE and the fourth dividing plate 1515 and communicates with a first inlet E21 formed in a lower portion of the turbine blade 1500. Some of air drawn into the first cooling passage C21 through the first inlet E21 is discharged through the cooling holes 1511 formed adjacent to the leading edge LE, and the other air is supplied into the second cooling passage C22.

The second cooling passage C22 may be formed by the perforated plate 1550 and the partitions 1560. A plurality of cooling fins 1583 may be formed in the second cooling passage C22. The partitions 1560 are spaced apart from each other in a height direction of the second cooling passage C22 and function to partition the second cooling passage C22 into several portions. Although three partitions 1560 may be installed in the second cooling passage C22, it is not limited thereto.

The perforated plate 1550 extends in the height direction of the second cooling passage C22 and defines the second cooling passage C22. A plurality of holes 1551 are formed in the perforated plate 1550. One end of each partitions 1560 may be coupled to the perforated plate 1550, and the other end thereof may be coupled to the trailing edge TE. If the partitions 1560 are formed in the second cooling passage C22 and are coupled to the perforated plate 1550, air may be uniformly supplied to the second cooling passage C22 partitioned by the partitions 1560.

The airfoil 1510 may further include a plurality of rear end cooling slots 1581 connected with the second cooling passage C22 to discharge air from the second cooling passage C22 and spaced apart from each other in a height direction of the trailing edge TE, and a dividing protrusion 1582 formed between the rear end cooling slots 1581 to separate the rear end cooling slots 1581 from each other. Air drawn into the second cooling passage C22 through the perforated plate 1550 is discharged through the rear end cooling slots 1581.

The third cooling passage C23 is formed in a zigzag pattern by the first dividing plate 1512, the second dividing plate 1513, the third dividing plate 1514, and the fourth dividing plate 1515. The first dividing plate 1512 is disposed between the perforated plate 1550 and the second dividing plate 1513. The first dividing plate 1512 and the second dividing plate 1513 are spaced apart from the outer shroud 1530. The third dividing plate 1514 is disposed between the second dividing plate 1513 and the fourth dividing plate 1515. A lower end of the third dividing plate 1514 is spaced apart from the inner shroud 1520.

Air supplied through a second inlet E22 moves along space defined between the first dividing plate 1512 and the second dividing plate 1513, and some of the air moves into space defined between the first dividing plate 1512 and the perforated plate 1550 and then is supplied into the second cooling passage C22. The other air moves into space defined between the second dividing plate 1513 and the third dividing plate 1514 and between the third dividing plate 1514 and the fourth dividing plate 1515 and then is discharged through the cooling holes 1511.

Here, a gap G13 between the first dividing plate 1512 and the perforated plate 1550 is gradually reduced from the outer shroud 1530 to the inner shroud 1520. Hence, air that moves between the first dividing plate 1512 and the perforated plate 1550 may uniformly pass through the perforated plate 1550 and then move into the second cooling passage C22.

Figure 6:
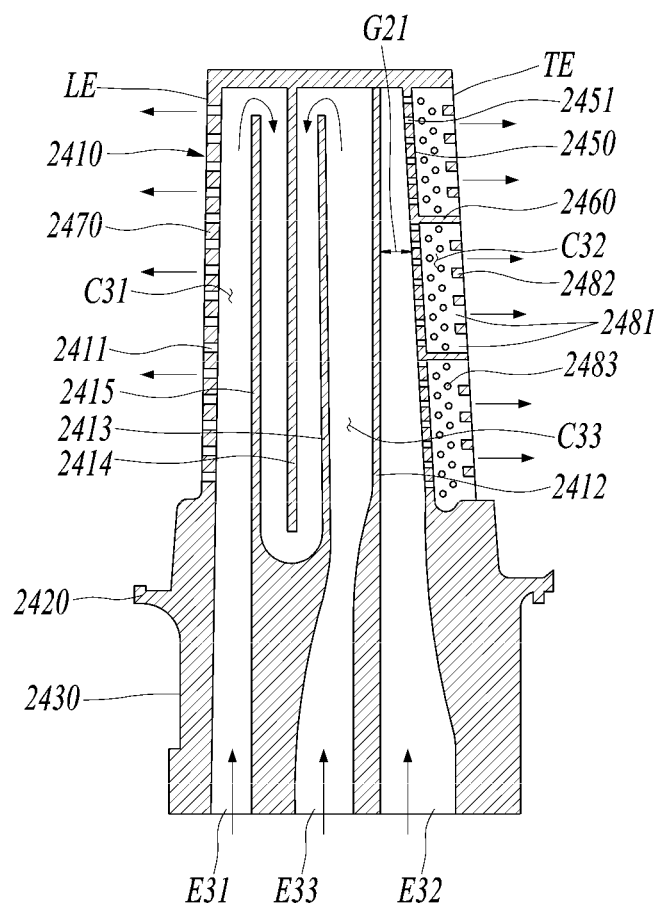
FIG. 6 is a longitudinal sectional view illustrating a turbine blade in accordance with another exemplary embodiment.

FIG. 6 is a longitudinal sectional view illustrating the turbine blade in accordance with another exemplary embodiment.

Referring to FIG. 6, the turbine blade 2400 may include an airfoil 2410 having a blade shape, a platform 2420 coupled to a lower portion of the airfoil 2410, and a root member 2430 which protrudes downwards from the platform 2420 and is coupled to the rotor disk. The airfoil 2410 may be a curved plate having a blade shape, and be formed to have an optimized blade shape according to specifications of a gas turbine.

The platform 2420 may be disposed between the airfoil 2410 and the root member 2430 and have an approximately rectangular plate or rectangular pillar shape. The platform 2420 has a side surface which comes into contact with a side surface of the platform 2420 of an adjacent turbine blade 2400 to maintain an interval between the adjacent turbine blades 2400.

The root member 2430 has a corrugated portion having an approximately fir-tree shape corresponding to the fir-tree-shaped corrugated portion formed in a slot of the rotor disk 2310. It is understood that the coupling structure of the root member 2430 is not limited thereto, and may be formed to have a dovetail structure. A first inlet E31, a second inlet E32, and a third inlet E33 for supply cooling air may be formed in a lower end of the root member 2430.

The airfoil 2410 may include a leading edge LE disposed at an upstream side based on a flow direction of combustion gas, and a trailing edge TE disposed at a downstream side. A plurality of cooling holes 2411 formed in a surface of the airfoil 2410 communicate with a cooling passage formed in the airfoil 2410 so that cooling air may be supplied to the surface of the airfoil 2410.

The airfoil 2410 may include an outer wall 2470 which forms an outer appearance, and cooling passages C31, C32, and C33, dividing plates 2412, 2413, 2414, and 2415, partitions 2460, and a perforated plate 2450 which are formed inside the outer wall 2470. The airfoil 2410 may include a first cooling passage C31 connected with the leading edge LE, a second cooling passage C32 connected with the trailing edge TE, and a third cooling passage C33 formed between the first cooling passage C31 and the second cooling passage C32. The airfoil 2410 may include a first dividing plate 2412, a second dividing plate 2413, a third dividing plate 2414, and a fourth dividing plate 2415 which extend in a height direction of the airfoil 2410 and divide an internal space of the airfoil 2410 into several portions.

The first cooling passage C31 is formed by the leading edge LE and the fourth dividing plate 2415 and communicates with the first inlet E31 formed in a lower portion of the turbine blade 2400. The second cooling passage C32 may be formed by the perforated plate 2450 and the partition 2460. A plurality of cooling fins 2483 may be formed in the second cooling passage C32. The partitions 2460 are spaced apart from each other in a height direction of the second cooling passage C32 and function to partition the second cooling passage C32 into several portions. The perforated plate 2450 extends in the height direction of the second cooling passage C32 and defines the second cooling passage C32. A plurality of holes 2451 are formed in the perforated plate 2450. One end of each partitions 2460 may be coupled to the perforated plate 2450, and the other end thereof may be coupled to the trailing edge TE.

The airfoil 2410 may further include a plurality of rear end cooling slots 2481 connected with the second cooling passage C32 to discharge air from the second cooling passage C32 and spaced apart from each other in a height direction of the trailing edge TE, and a dividing protrusion 2482 formed between the rear end cooling slots 2481 to separate the rear end cooling slots 2481 from each other. Air drawn into the second cooling passage C32 through the perforated plate 2450 is discharged through the rear end cooling slots 2481.

The third cooling passage C33 is formed in a zigzag pattern by the first dividing plate 2412, the second dividing plate 2413, the third dividing plate 2414, and the fourth dividing plate 2415. The first dividing plate 2412 is disposed between the perforated plate 2450 and the second dividing plate 2413. The first dividing plate 2412 extends to an upper end tip of the airfoil 2410. The second dividing plate 2413 is spaced apart from the upper end tip of the airfoil 2410.

The third dividing plate 2414 is disposed between the second dividing plate 2413 and the fourth dividing plate 2415. A lower end of the third dividing plate 2414 is spaced apart form a lower support structure.

Air supplied through the second inlet E32 moves into space defined between the first dividing plate 2412 and the perforated plate 2450 and is supplied into the second cooling passage C32. Air supplied through the third inlet E33 moves into space defined between the second dividing plate 2413 and the third dividing plate 2414 and between the third dividing plate 2414 and the fourth dividing plate 2415 and then is discharged through the cooling holes 2411.

Here, a gap G21 between the first dividing plate 2412 and the perforated plate 2450 is gradually increased from the outer side to the inner side. Hence, air that moves between the first dividing plate 2412 and the perforated plate 2450 may uniformly pass through the perforated plate 2450 and move into the second cooling passage C32. Air between the first dividing plate 2412 and the perforated plate 2450 moves outward toward the tip of the airfoil 2410. As the gap G21 between the first dividing plate 2412 and the perforated plate 2450 is gradually reduced outward, air is compressed toward the perforated plate 2450 while moving outward. Therefore, air may be uniformly supplied to the perforated plate 2450.

Figure 7:
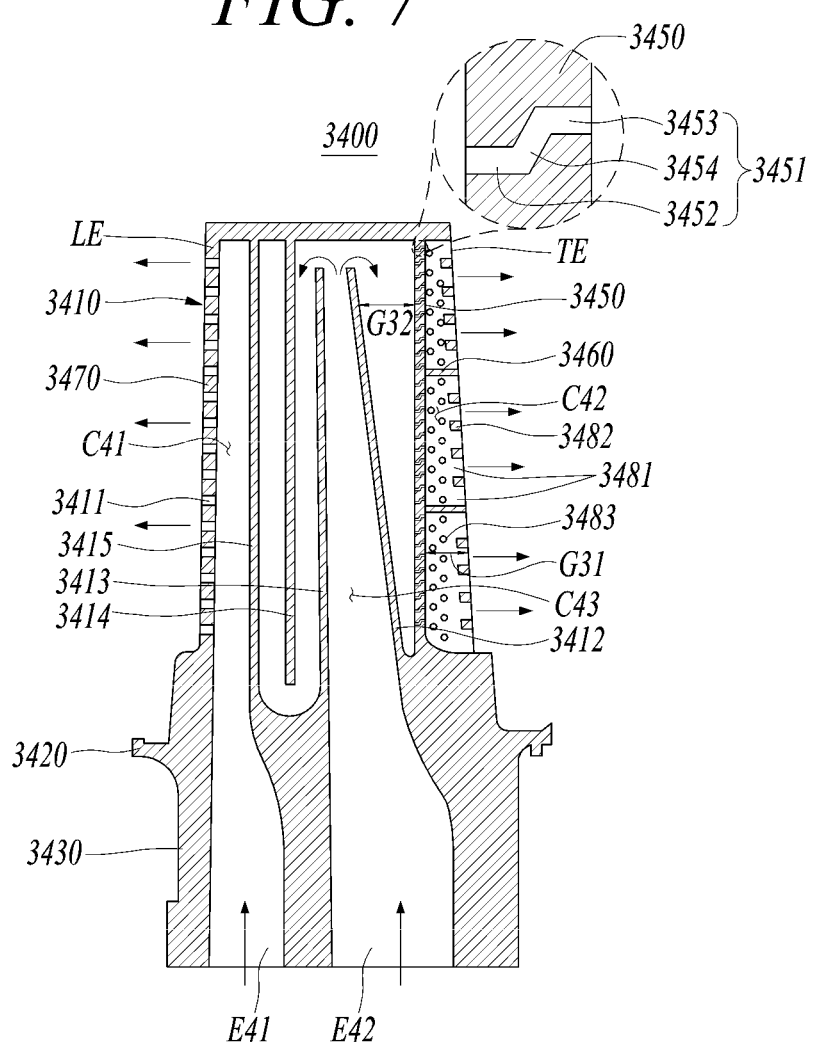
FIG. 7 is a longitudinal sectional view illustrating a turbine blade in accordance with another exemplary embodiment.

FIG. 7 is a longitudinal sectional view illustrating the turbine blade in accordance with another exemplary embodiment.

Referring to FIG. 7, the turbine blade 3400 may include an airfoil 3410 having a blade shape, a platform 3420 coupled to a lower portion of the airfoil 3410, and a root member 3430 which protrudes downwards from the platform 3420. The airfoil 3410 may be a curved plate having a blade shape, and be formed to have an optimized blade shape according to specifications of a gas turbine.

The platform 3420 may be disposed between the airfoil 3410 and the root member 3430 and have an approximately rectangular plate or rectangular pillar shape. The platform 3420 has a side surface which comes into contact with a side surface of the platform 3420 of an adjacent turbine blade 3400 to maintain an interval between the adjacent turbine blades 3400.

The root member 3430 has a corrugated portion having an approximately fir-tree shape corresponding to the fir-tree-shaped corrugated portion formed in a slot of the rotor disk 3310. A first inlet E41 and a second inlet E42 for supply cooling air may be formed in a lower end of the root member 3430.

The airfoil 3410 may include a leading edge LE disposed at an upstream side based on a flow direction of combustion gas, and a trailing edge TE disposed at a downstream side. A plurality of cooling holes 3411 formed in a surface of the airfoil 3410 communicates with a cooling passage formed in the airfoil 3410 so that cooling air may be supplied to the surface of the airfoil 3410.

The airfoil 3410 may include an outer wall 3470 which forms an outer appearance, and cooling passages C41, C42, and C43, dividing plates 3412, 3413, 3414, and 3415, partitions 3460, and a perforated plate 3450 which are formed inside the outer wall 3470. The airfoil 3410 may include a first cooling passage C41 connected with the leading edge LE, a second cooling passage C42 connected with the trailing edge TE, and a third cooling passage C43 formed between the first cooling passage C41 and the second cooling passage C42. The airfoil 3410 may include a first dividing plate 3412, a second dividing plate 3413, a third dividing plate 3414, and a fourth dividing plate 3415 which extend in a height direction of the airfoil 3410 and divide an internal space of the airfoil 3410 into several portions.

The first cooling passage C41 is formed by the leading edge LE and the fourth dividing plate 3415 and communicates with the first inlet E41 formed in a lower portion of the turbine blade 3400. Some of air drawn into the first cooling passage C41 is discharged through the cooling holes 3411 formed adjacent to the leading edge LE, and the other air is supplied into the second cooling passage C42.

The second cooling passage C42 may be formed by the perforated plate 3450 and the partitions 3460. A plurality of cooling fins 3483 may be formed in the second cooling passage C42. The partitions 3460 are spaced apart from each other in a height direction of the second cooling passage C42 and function to partition the second cooling passage C42 into several portions.

The perforated plate 3450 extends in the height direction of the second cooling passage C42 and defines the second cooling passage C42. A plurality of holes 3451 are formed in the perforated plate 3450. One end of each partitions 3460 may be coupled to the perforated plate 3450, and the other end thereof may be coupled to the trailing edge TE. The holes 3451 are formed to pass through the perforated plate 3450 in a thickness direction. The plurality of holes 3451 may be uniformly formed in the perforated plate 3450.

Each of the holes 3451 may include a first passage 3452 which is perpendicularly connected to a surface of the perforated plate 3450, a second passage 3453 which is spaced apart from the first passage 3452, and a third passage 3454 which connects the first passage 3452 and the second passage 3453 and is inclined with respect to the first passage 3452 and the second passage 3453. The third passage 3454 may be inclined from the first passage 3452 in a direction toward the tip of the airfoil 3410. If the hole 3451 includes the first passage 3452, the second passage 3453, and the third passage 3454, a contact area between the perforated plate 3450 and air is increased so that the cooling efficiency may be enhanced.

The airfoil 3410 may further include a plurality of rear end cooling slots 3481 connected with the second cooling passage C42 to discharge air from the second cooling passage C42 and spaced apart from each other in a height direction of the trailing edge TE, and a dividing protrusion 3482 formed between the rear end cooling slots 3481 to separate the rear end cooling slots 3481 from each other. Air drawn into the second cooling passage C42 through the perforated plate 3450 is discharged through the rear end cooling slots 3481.

The third cooling passage C43 is formed in a zigzag pattern by the first dividing plate 3412, the second dividing plate 3413, the third dividing plate 3414, and the fourth dividing plate 3415. The first dividing plate 3412 is disposed between the perforated plate 3450 and the second dividing plate 3413. The first dividing plate 3412 and the second dividing plate 3413 are spaced apart from an upper end tip of the airfoil 3410. The third dividing plate 3414 is disposed between the second dividing plate 3413 and the fourth dividing plate 3415. A lower end of the third dividing plate 3414 is spaced apart from a lower support structure to form space therebetween.

Air supplied through the second inlet E42 moves along space defined between the first dividing plate 3412 and the second dividing plate 3413, and some of the air moves into space defined between the first dividing plate 3412 and the perforated plate 3450 and then is supplied into the second cooling passage C42. The other air moves into space defined between the second dividing plate 3413 and the third dividing plate 3414 and between the third dividing plate 3414 and the fourth dividing plate 3415 and then is discharged through the cooling holes 3411.

A gap G31 between the perforated plate 3450 and the trailing edge TE is gradually increased from the outer side to the inner side. Hence, the widths of the partitions 3460 spaced apart from each other in the height direction of the second cooling passage C42 may differ from each other. In other words, the partition 3460 that is closer to the root member 3430 may have a width greater than that of the partition 3460 that is disposed at the outer side. That is, the width of the partition 3460 that is disposed at the inner side in the airfoil 3410 may be greater than the width of the partition 3460 that is disposed at the outer side in the airfoil 3410.

On the one hand, a gap G32 between the first dividing plate 3412 and the perforated plate 3450 is gradually reduced toward the inner side. If the gap G31 between the perforated plate 3450 and the trailing edge TE is gradually increased toward the inner side and the gap G32 between the first dividing plate 3412 and the perforated plate 3450 is gradually reduced toward the inner side, a portion adjacent to the trailing edge TE may be uniformly cooled.

In an airfoil and a turbine in accordance with an exemplary embodiment, a partition and a perforated plate are coupled to each other, so that the cooling efficiency of a trailing edge portion may be enhanced.

While exemplary embodiments have been described with reference to the accompanying drawings, it will be apparent to those skilled in the art that various modifications in form and details. The present disclosure may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. An airfoil including a leading edge and a trailing edge, the airfoil comprising:
   a first cooling passage connected to the leading edge;
   a second cooling passage connected to the trailing edge;
   a third cooling passage formed between the first cooling passage and the second cooling passage;
   a plurality of partitions provided in the second cooling passage and configured to partition the second cooling passage into a plurality of portions in a height direction of the second cooling passage;
   a perforated plate extending in the height direction of the second cooling passage, and coupled with the partitions to support the partitions; and
   a first dividing plate formed in the third cooling passage and configured to face the perforated plate, and including an upper end spaced apart from a top surface of a turbine blade to form a space into which air moves,
   wherein a gap between the first dividing plate and the perforated plate is gradually reduced in a direction of air movement, and
   wherein a gap between the perforated plate and the trailing edge is gradually increased in the direction of air movement.

2. The airfoil according to claim 1, further comprising a second dividing plate formed in the third cooling passage and configured to face the first dividing plate, and including an upper end spaced apart from the top surface of the turbine blade,
   wherein a gap between the second dividing plate and the first dividing plate is gradually increased from the outer side to the inner side.

3. The airfoil according to claim 1, further comprising a plurality of rear end cooling slots formed in the second cooling passage to discharge air from the second cooling passage and spaced apart from each other in a height direction of the trailing edge.

4. The airfoil according to claim 1, wherein the number of holes formed in the perforated plate per unit area is gradually increased from the outer side to the inner side.

5. The airfoil according to claim 1, wherein the partition that is disposed at the inner side has a width greater than a width of the partition that is disposed at the outer side.

6. The airfoil according to claim 1, further comprising a first dividing plate formed in the third cooling passage and configured to face the perforated plate, and including an upper end coming into contact with a top surface of a turbine blade.

7. The airfoil according to claim 6, wherein the first dividing plate forms a first intermediate passage through which air drawn from a lower portion of the airfoil rises, and a gap between the first dividing plate and the perforated plate is gradually increased from an outer side to an inner side.

8. The airfoil according to claim 1, wherein a hole formed in the perforated plate comprises a first passage perpendicularly connected to a surface of the perforated plate, a second passage spaced apart from the first passage, and a third passage connecting the first passage and the second passage and inclined with respect to the first passage and the second passage.

9. A turbine comprising:
   a rotor disk configured to be rotatable; and
   a plurality of turbine blades installed on the rotor disk,
   wherein each of the turbine blades comprises an airfoil having a blade shape and including a leading edge and a trailing edge, a platform coupled to a lower portion of the airfoil, and a root member protruding downward from the platform and coupled to the rotor disk, and
   wherein the airfoil comprises:
   a first cooling passage connected to the leading edge;
   a second cooling passage connected to the trailing edge;
   a third cooling passage formed between the first cooling passage and the second cooling passage;
   a plurality of partitions provided in the second cooling passage and configured to partition the second cooling passage into a plurality of portions in a height direction of the second cooling passage;
   a perforated plate extending in the height direction of the second cooling passage, and coupled with the partitions; and
   a first dividing plate formed in the third cooling passage and configured to face the perforated plate, and including an upper end spaced apart from a top surface of a turbine blade to form a space into which air moves,
   wherein a gap between the first dividing plate and the perforated plate is gradually reduced in a direction of air movement, and
   wherein a gap between the perforated plate and the trailing edge is gradually increased in the direction of air movement.

10. The turbine according to claim 9, wherein the airfoil further comprises a second dividing plate formed in the third cooling passage and configured to face the first dividing plate, and including an upper end spaced apart from the top surface of the turbine blade, and wherein a gap between the second dividing plate and the first dividing plate is gradually increased from the outer side to the inner side.

11. The turbine according to claim 10, wherein the airfoil further comprises a plurality of rear end cooling slots formed in the second cooling passage to discharge air from the second cooling passage and spaced apart from each other in a height direction of the trailing edge.

12. The turbine according to claim 11, wherein the number of holes formed in the perforated plate per unit area is gradually increased from the outer side to the inner side.

13. The turbine according to claim 9, wherein the partition that is disposed at the inner side has a width greater than a width of the partition that is disposed at the outer side.

14. The turbine according to claim 9, wherein the airfoil further comprises a first dividing plate formed in the third cooling passage and configured to face the perforated plate, and including an upper end coming into contact with a top surface of the turbine blade.

15. The turbine according to claim 14, wherein the first dividing plate forms a first intermediate passage through which air drawn from a lower portion of the airfoil rises, and a gap between the first dividing plate and the perforated plate is gradually increased from an outer side to an inner side.

16. A gas turbine comprising:
a compressor configured to compress air drawn thereinto from an outside;
a combustor configured to mix fuel with air compressed by the compressor and combust a mixture of the fuel and the compressed air; and
a turbine including a plurality of turbine blades configured to be rotated by combustion gas discharged from the combustor,
wherein each of the turbine blades comprises an airfoil having a blade shape and including a leading edge and a trailing edge, a platform coupled to a lower portion of the airfoil, and a root member protruding downward from the platform and coupled to the rotor disk, and
wherein the airfoil comprises:
a first cooling passage connected to the leading edge;
a second cooling passage connected to the trailing edge;
a third cooling passage formed between the first cooling passage and the second cooling passage;
a plurality of partitions provided in the second cooling passage and configured to partition the second cooling passage into a plurality of portions in a height direction of the second cooling passage;
a perforated plate extending in the height direction of the second cooling passage, and coupled with the partitions; and
a first dividing plate formed in the third cooling passage and configured to face the perforated plate, and including an upper end spaced apart from a top surface of a turbine blade to form a space into which air moves,
wherein a gap between the first dividing plate and the perforated plate is gradually reduced in a direction of air movement, and
wherein a gap between the perforated plate and the trailing edge is gradually increased in the direction of air movement.

* * * * *